United States Patent
Alipov et al.

(10) Patent No.: US 10,789,256 B2
(45) Date of Patent: Sep. 29, 2020

(54) METHOD AND COMPUTER DEVICE FOR SELECTING A CURRENT CONTEXT-SPECIFIC RESPONSE FOR A CURRENT USER QUERY

(71) Applicant: YANDEX EUROPE AG, Lucerne (CH)

(72) Inventors: Vyacheslav Vyacheslavovich Alipov, Tomsk (RU); Roman Leonidovich Kuznetsov, Cheboksary (RU); Boris Konstantinovich Yangel, Nalchik (RU)

(73) Assignee: YANDEX EUROPE AG, Lucerne (CH)

( * ) Notice: Subject to any disclaimer, the term of this patent is extended or adjusted under 35 U.S.C. 154(b) by 237 days.

(21) Appl. No.: 16/031,887

(22) Filed: Jul. 10, 2018

(65) Prior Publication Data
US 2019/0205451 A1    Jul. 4, 2019

(30) Foreign Application Priority Data
Dec. 29, 2017   (RU) ................. 2017146889

(51) Int. Cl.
*G06F 16/2457* (2019.01)
*G06N 3/02* (2006.01)
(Continued)

(52) U.S. Cl.
CPC .... *G06F 16/24575* (2019.01); *G06F 16/2425* (2019.01); *G06F 16/24578* (2019.01);
(Continued)

(58) Field of Classification Search
CPC ............. G06F 16/24575; G06F 40/274; G06F 16/90332; G06F 16/24578; G06F 16/2425;
(Continued)

(56) References Cited

U.S. PATENT DOCUMENTS

| 5,712,957 A | 1/1998 | Waibel et al. |
|---|---|---|
| 6,701,294 B1 | 3/2004 | Ball et al. |

(Continued)

FOREIGN PATENT DOCUMENTS

| RU | 2419858 C2 | 5/2011 |
|---|---|---|
| RU | 2427044 C1 | 8/2011 |

OTHER PUBLICATIONS

He, et al. Learning from Imbalanced Data. IEEE Transactions on Knowledge and Data Engineering. 21:9, Sep. 2009, pp. 1263-1284. (Year: 2009).*

(Continued)

*Primary Examiner* — Alex Gofman
*Assistant Examiner* — Shelly X Qian
(74) *Attorney, Agent, or Firm* — BCF LLP

(57) ABSTRACT

A method and computer device for selecting a current context-specific response for a current query is disclosed. The method comprises receiving a current context snippet comprising the current query; generating, by a neural network, a current context vector based on the current context snippet; for each response snippet associated with a respective one of a plurality of vectors, generating a respective ranking score as a value of (1) a respective first vector similarity value being indicative of a linguistic similarity between (i) the current context snippet and (ii) the respective context snippet, and (2) a respective second vector similarity value being indicative of a linguistic and a logical similarity between (i) the current context snippet and (ii) the respective response snippet. The method comprises selecting the current context-specific response amongst the response snippets based on the respective ranking scores.

20 Claims, 6 Drawing Sheets

(51) Int. Cl.
*G06F 16/242* (2019.01)
*G06F 16/9032* (2019.01)
*G06F 40/274* (2020.01)

(52) U.S. Cl.
CPC ...... *G06F 16/90332* (2019.01); *G06F 40/274* (2020.01); *G06N 3/02* (2013.01)

(58) Field of Classification Search
CPC .......... G06F 40/00; G06F 16/30; G06N 3/02; G06N 3/084; G06N 20/20; G10L 15/08; G10L 13/00
See application file for complete search history.

(56) References Cited

U.S. PATENT DOCUMENTS

| | | | |
|---|---|---|---|
| 8,140,335 | B2 | 3/2012 | Kennewick et al. |
| 8,239,370 | B2 | 8/2012 | Wong et al. |
| 8,688,667 | B1 | 4/2014 | Kurzion et al. |
| 8,914,277 | B1 | 12/2014 | Liu |
| 8,935,163 | B2 | 1/2015 | Huang et al. |
| 9,165,028 | B1 | 10/2015 | Christensen et al. |
| 9,342,626 | B1 | 5/2016 | Das et al. |
| 2010/0036667 | A1 | 2/2010 | Byford et al. |
| 2010/0306191 | A1 | 12/2010 | Lebeau et al. |
| 2011/0208730 | A1 | 8/2011 | Jiang et al. |
| 2011/0314026 | A1 | 12/2011 | Pickens et al. |
| 2015/0012829 | A1 | 1/2015 | Brown et al. |
| 2015/0127327 | A1 | 5/2015 | Bacchiani et al. |
| 2015/0278358 | A1 | 10/2015 | Abib et al. |
| 2016/0078087 | A1 | 3/2016 | Wang et al. |
| 2017/0032035 | A1 | 2/2017 | Gao et al. |
| 2017/0124447 | A1 | 5/2017 | Chang et al. |
| 2017/0140755 | A1 | 5/2017 | Andreas et al. |
| 2018/0107933 | A1 | 4/2018 | Wang |
| 2018/0232376 | A1* | 8/2018 | Zhu ........................ G06F 40/295 |

OTHER PUBLICATIONS

Frankle, et al. The Lottery Ticket Hypothesis: Training Pruned Neural Network Architectures. arXiv.org > cs > arXiv:1803.03635v2, Apr. 2018, pp. 1-21. (Year: 2018).*

Saltan, et al. DLS@CU: Sentence Similarity from Word Alignment and Semantic Vector Composition. SemEval 2015, pp. 148-153. (Year: 2015).*

Song et al., "Two are Better than One: An Ensemble of Retrieval- and Generation-Based Dialog Systems", Peking University, China, 2016, pp. 1-11.

Vergnes, "Interactive Assistant for Activities of Daily Living", IOS Press, Canada, 2003, pp. 1-8.

Sundblad et al., "OLGA—a Multimodal Interactive Information Assistant", CID—Center for User Oriented IT Design, Sweden, 2 pages, bladhttps://www.semanticscholar.org/paper/OLGA-a-multimodal-interactive-information-assistant-Sundblad-Sundblad/6f9c6b7e09947c34ae54fcc29b38d96a71acc7c5.

Search Report with regard to the counterpart RU Patent Application No. 2017146280 completed Oct. 28, 2019.

Search Report with regard to the counterpart RU Patent Application No. 2017146889 completed Apr. 18, 2019.

Office Action with regard to the counterpart U.S. Appl. No. 16/022,882 dated Aug. 7, 2020.

* cited by examiner

METHOD AND COMPUTER DEVICE FOR SELECTING A CURRENT CONTEXT-SPECIFIC RESPONSE FOR A CURRENT USER QUERY

CROSS-REFERENCE

The present application claims priority from Russian Patent Application No. 2017146889, entitled "Method and Computer Device for Selecting a Current Context-Specific Response for a Current User Query", filed Dec. 29, 2017, the entirety of which is incorporated herein by reference.

FIELD

The present technology relates to intelligent personal assistant systems and, more particularly, to a method and computer device for selecting a current context-specific response for a current user query.

BACKGROUND

Electronic devices, such as smartphones and tablets, are able to access an increasing and diverse number of applications and services for processing and/or accessing different types of information. However, novice users and/or impaired users and/or users operating a vehicle may not be able to effectively interface with such devices mainly due to the variety of functions provided by these devices or the inability to use the machine-user interfaces provided by such devices (such as a key board). For example, a user who is driving or a user who is visually-impaired may not be able to use the touch screen key board associated with some of these devices.

Intelligent Personal Assistant (IPA) systems have been developed to perform functions in response to user requests. Such IPA systems may be used, for example, for information retrieval and navigation. A conventional IPA system, such as Ski® IPA system for example, can accept simple human natural language inputs from a device and perform a large variety of tasks for the user. For example, a user can communicate with Ski® IPA system by providing spoken utterances (through Siri®'s voice interface) for asking, for example, what the current weather is, where the nearest shopping mall is, and the like. The user can also ask for execution of various applications installed on the electronic device.

Conventional IPA systems are mainly focused on analyzing a user request and providing a logical response therefor. However, different users have different styles of speech which range from a very formal style of speech to a very familiar or popular style of speech. For that reason, providing logical responses that also mimic the user's style of speech is a very difficult task.

SUMMARY

Developers of the present technology have appreciated certain technical drawbacks associated with the existing IPA systems. Conventional IPA systems are focused on providing logical responses to queries submitted by users. However, it should be noted that some queries submitted by the users are "context specific", i.e. are submitted in view of a "context" in which the queries are submitted. For example, some queries may be submitted in a formal context, such as during a conversation with a coworker, or in a familiar context, such as during a conversation with a friend or family member. As such, the style of speech of the user may vary and, therefore, the queries and/or responses in a given conversation depend on the context of the given conversation.

It is an object of the present technology to ameliorate at least some of the inconveniences present in the prior art. Developers of the present technology envisaged a system that [ ] takes into account (i) a logical similarity between a response and a conversation that the user is having and (ii) a linguistic similarity between a response and the conversation that the user is having. That way, it is possible to select a context-specific response to be provided to the user that is "logically" related to the conversation (i.e. the context-specific response being suitable for the conversation and the query for which it is provided) and that is "linguistically" related to the conversation (i.e., the response and the conversation being of a same style of speech).

In a first broad aspect of the present technology, there is provided a method of selecting a current context-specific response for a current user query. The method is executable by a server communicatively coupled to a database storing a plurality of vectors. Each vector is associated with a respective conversation snippet and each conversation snippet includes a respective context snippet and a respective response snippet. Each vector has (i) a respective context vector indicative of features of the respective context snippet and (ii) a respective response vector indicative of features of the respective response snippet. The context vector and the response vector of each one of the plurality of vectors has been generated by a neural network. The neural network has been trained: based on a first context snippet and a first response snippet that has occurred in a common conversation snippet and a second response snippet that has not occurred with the first context snippet. The neural network has been trained such that a positive-example vector similarity value between (i) a first response vector generated based on the first response snippet and (ii) a first context vector generated based on the first context snippet is superior to a negative-example vector similarity value between (i) a second response vector generated based on the second response snippet and (ii) the first context vector. The method comprises: receiving, by the server, a current context snippet comprising the current user query; generating, by the neural network of the server, a current context vector based on the current context snippet where the current context vector is indicative of features of the current content snippet; for each response snippet associated with a respective vector, generating, by the server, a respective ranking score being a sum of: a respective first vector similarity value between (i) the current context vector and (ii) the respective context vector where each first vector similarity value is indicative of a linguistic similarity between (i) the current context snippet and (ii) the respective context snippet; and a respective second vector similarity value between (i) the current context vector and (ii) the respective response vector where each second vector similarity value is indicative of a linguistic and a logical similarity between (i) the current context snippet and (ii) the respective response snippet; and selecting, by the server, the current context-specific response amongst the response snippets based on the respective ranking scores.

In some embodiments of the method, the method further comprises ranking, by the server, the response snippets based on the respective ranking scores. The selecting the current content-specific response comprises selecting, by the server, a top ranked response snippet as the current context-specific response for the current user query.

In some embodiments of the method, the neural network comprises: a context sub-network that has generated the first context vector based on the first context snippet; and a response sub-network that has generated (i) the first response vector generated based on the first response snippet and (ii) the second response vector generated based on the second response snippet.

In some embodiments of the method, the generating the current context vector based on the current context snippet is executed by the context sub-network.

In some embodiments of the method, the neural network has been trained such that the positive-example vector similarity value is superior by at least a pre-determined threshold value over the negative-example vector similarity value.

In some embodiments of the method, the neural network has been trained to generate the first context vector and the first and second response vectors so as to maximize a difference between the positive-example vector similarity value and the negative-example vector similarity value.

In some embodiments of the method, the positive-example vector similarity value is indicative of a vector distance between (i) the first response vector and (ii) the first context vector. The negative-example vector similarity value is indicative of a vector distance between (i) the second response vector and (ii) the first context vector.

In some embodiments of the method, the positive-example vector similarity value is a scalar multiplication between (i) the first response vector and (ii) the first context vector. The negative-example vector similarity value is a scalar multiplication between (i) the second response vector and (ii) the first context vector.

In some embodiments of the method, a given first vector similarity value is a scalar multiplication between (i) the current context vector and (ii) the respective context vector. A given second vector similarity value is a scalar multiplication between (i) the current context vector and (ii) the respective response vector.

In some embodiments of the method, the method further comprises selecting, by the server, the plurality of vectors based on the current context snippet amongst all vectors stored in the database.

In some embodiments of the method, a given ranking score is a weighted sum of the respective first vector similarity value and the respective second vector similarity value.

In some embodiments of the method, the context vector and the response vector of each one of the plurality of vectors, which have been generated by a neural network, have been concatenated into the respective one of the plurality of vectors.

In a second broad aspect of the present technology, there is provided a computer device for selecting a current context-specific response for a current user query. The computer device is communicatively coupled to a database storing a plurality of vectors. Each vector is associated with a respective conversation snippet and each conversation snippet includes a respective context snippet and a respective response snippet. Each vector has (i) a respective context vector indicative of features of the respective context snippet and (ii) a respective response vector indicative of features of the respective response snippet. The context vector and the response vector of each one of the plurality of vectors has been generated by a neural network. The neural network has been trained based on a first context snippet and a first response snippet that have occurred in a common conversation snippet and a second response snippet has not occurred with the first context snippet, such that a positive-example vector similarity value between (i) a first response vector generated based on the first response snippet and (ii) a first context vector generated based on the first context snippet is superior to a negative-example vector similarity value between (i) a second response vector generated based on the second response snippet and (ii) the first context vector. The computer device is configured to: receive a current context snippet that comprises the current user query; generate, by the neural network, a current context vector based on the current context snippet where the current context vector is indicative of features of the current content snippet; for each response snippet associated with a respective vector, generate a respective ranking score being a sum of: a respective first vector similarity value between (i) the current context vector and (ii) the respective context vector where each first vector similarity value is indicative of a linguistic similarity between (i) the current context snippet and (ii) the respective context snippet; and a respective second vector similarity value between (i) the current context vector and (ii) the respective response vector where each second vector similarity value being indicative of a linguistic and a logical similarity between (i) the current context snippet and (ii) the respective response snippet; and select the current context-specific response amongst the response snippets based on the respective ranking scores.

In some embodiments of the computer device, the computer device is a server.

In some embodiments of the computer device, the computer device is an electronic device associated with a user.

In some embodiments of the computer device, the computer device is further configured to rank the response snippets based on the respective ranking scores. The computer device configured to select the current content-specific response comprises the computer device that is configured to select a top ranked response snippet as the current context-specific response for the current user query.

In some embodiments of the computer device, the neural network comprises: a context sub-network that has generated the first context vector based on the first context snippet; and a response sub-network that has generated (i) the first response vector generated based on the first response snippet and (ii) the second response vector generated based on the second response snippet.

In some embodiments of the computer device, the computer device is configured to generate the current context vector based on the current context snippet by employing the context sub-network.

In some embodiments of the computer device, the neural network has been trained such that the positive-example vector similarity value is superior by at least a pre-determined threshold value over the negative-example vector similarity value.

In some embodiments of the computer device, the positive-example vector similarity value is indicative of a vector distance between (i) the first response vector and (ii) the first context vector. The negative-example vector similarity value is indicative of a vector distance between (i) the second response vector and (ii) the first context vector.

In some embodiments of the computer device, the positive-example vector similarity value is a scalar multiplication between (i) the first response vector and (ii) the first context vector. The negative-example vector similarity value is a scalar multiplication between (i) the second response vector and (ii) the first context vector.

In some embodiments of the computer device, a given first vector similarity value is a scalar multiplication between (i) the current context vector and (ii) the respective context vector. A given second vector similarity value is a scalar multiplication between (i) the current context vector and (ii) the respective response vector.

In the context of the present specification, a "server" is a computer program that is running on appropriate hardware and is capable of receiving requests (e.g., from devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "device" is any computer hardware that is capable of running software appropriate to the relevant task at hand. Thus, some (non-limiting) examples of devices include personal computers (desktops, laptops, netbooks, etc.), smartphones, and tablets, as well as network equipment such as routers, switches, and gateways. It should be noted that a device acting as a device in the present context is not precluded from acting as a server to other devices. The use of the expression "a device" does not preclude multiple devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
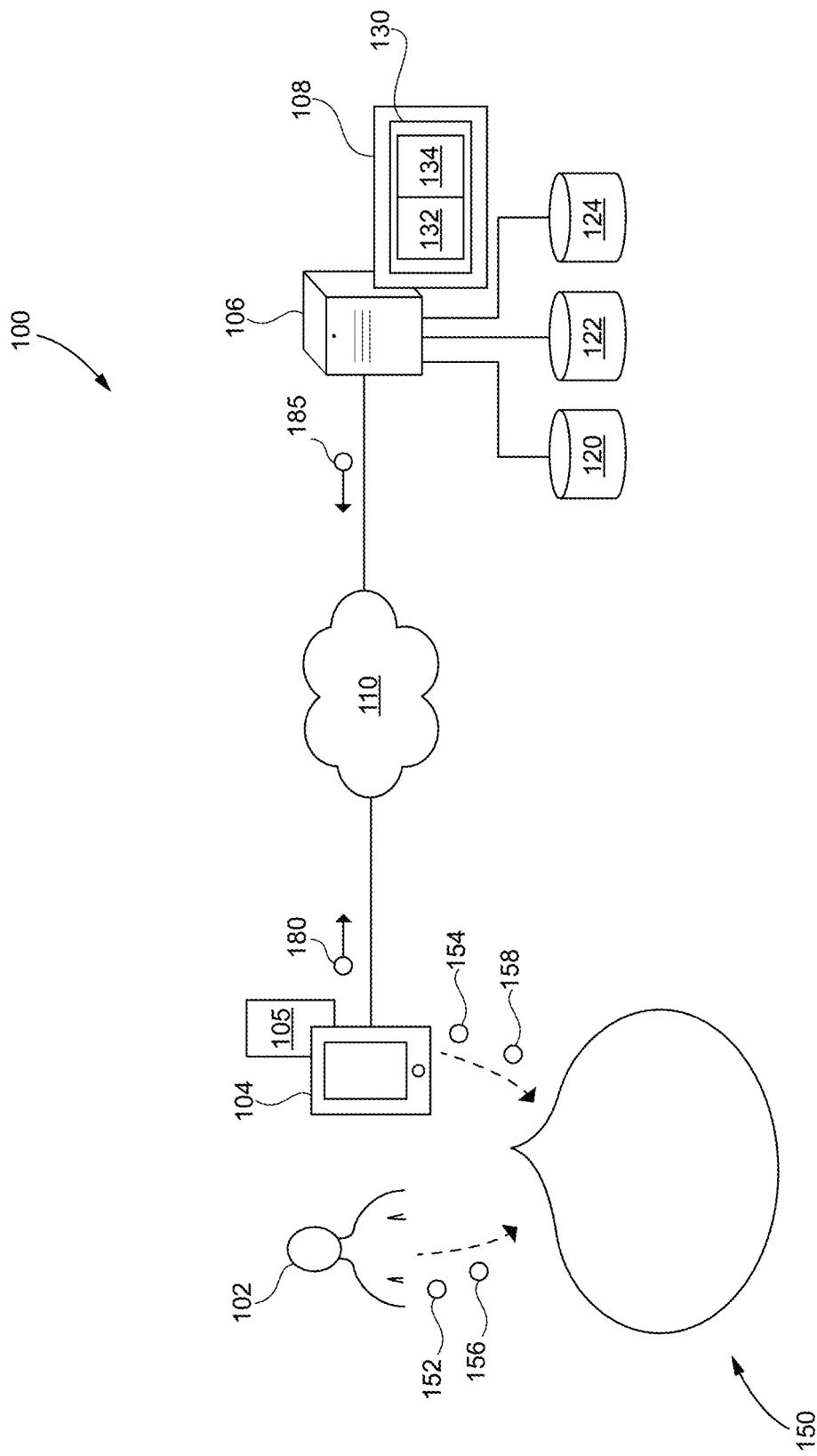
FIG. 1 depicts a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology.

These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to provide context-specific responses to user queries, which can be said to result in a "conversation" between a given user and a given electronic device. For example, sound indications 152 and 156 (such as spoken utterances) from a user 102 may be detected by an electronic device 104 (or simply a "device 104"), which, in response, is configured to provide sound indications 154 and 158 (such as spoken utterances or "machine generated utterances"). As such, it can be said that this results in a conversation 150 between the user 102 and the device 104, where the conversation 150 is composed of (i) the sound indications 152 and 156 and (ii) the sound indications 154 and 158.

Various components of the system 100 and how these components may be configured for implementing the provision of the sound indications 154 and 158 will now be described.

User Device

As previously mentioned, the system 100 comprises the device 104. The implementation of the device 104 is not particularly limited, but as an example, the device 104 may be implemented as a personal computer (desktops, laptops, netbooks, etc.), a wireless communication device (such as a smartphone, a cell phone, a tablet, a smart speaker and the like), as well as network equipment (such as routers, switches, and gateways). As such, the device 104 can sometimes be referred to as an "electronic device", "end user device", "client electronic device" or simply "device". It should be noted that the fact that the device 104 is associated with the user 102 does not need to suggest or imply any mode of operation—such as a need to log in, a need to be registered, or the like.

It is contemplated that the device 104 comprises hardware and/or software and/or firmware (or a combination thereof), as is known in the art, in order to (i) detect or capture the sound indications 152 and 156 and (ii) to provide or reproduce the sound indications 154 and 158. For example, the device 104 may comprise one or more microphones for detecting or capturing the sound indications 152 and 156 and one or more speakers for providing or reproducing the sound indications 154 and 158.

The device 104 also comprises hardware and/or software and/or firmware (or a combination thereof), as is known in the art, in order to execute an intelligent personal assistant (IPA) application 105. Generally speaking, the purpose of the IPA application 105, also known as a "chatbot", is to (i) enable the user 102 to submit queries in a form of spoken utterances (e.g., the sound indications 152 and 156) and, in response, (ii) provide to the user 102 context-specific responses in a form of spoken utterances (e.g., the sound indications 154 and 158). Submission of queries and provision of context-specific responses may be executed by the IPA application 105 via a natural language user interface.

Generally speaking, the natural language user interface of the IPA application 105 may be any type of computer-human interface where linguistic phenomena such as verbs, phrases, clauses and the like act as user interface controls for extracting, selecting, modifying or otherwise generating data in the IPA application 105.

For example, when spoken utterances of the user 102 (e.g., the sound indications 152 and 156) are detected (i.e. captured) by the device 104, the IPA application 105 may employ its natural language user interface in order to analyze the spoken utterances of the user 102 and extract data therefrom which is indicative of queries of the user 102. Also, data indicative of context-specific responses, which may be received by the device 104, is analyzed by the natural language user interface of the IPA application 105 in order to provide or reproduce spoken utterances (e.g., the sound indications 154 and 158) indicative of the context-specific responses.

Alternatively or additionally, it is contemplated that the IPA application 105 may employ a text-based computer-human interface for (i) enabling the user 102 to submit indications of queries in a text-based form and, in response, (ii) providing the user 102 with indications of context-specific responses in a text-based form.

Communication Network

In the illustrative example of the system 100, the device 104 is communicatively coupled to a communication network 110 for accessing and transmitting data packets to/from a server 112 and/or other web resources (not depicted). In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the device 104 and the communication network 110 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

Server

As previously mentioned, the system 100 also comprises the server 106 that can be implemented as a conventional computer server. In an example of an embodiment of the present technology, the server 106 can be implemented as a Dell™ PowerEdge™ Server running the Microsoft™ Windows Server™ operating system. Needless to say, the server 106 can be implemented in any other suitable hardware, software, and/or firmware, or a combination thereof. In the depicted non-limiting embodiments of the present technology, the server 106 is a single server. In alternative non-limiting embodiments of the present technology, the functionality of the server 106 may be distributed and may be implemented via multiple servers.

Generally speaking, the server 106 is configured to (i) receive data indicative of conversations, which comprise user queries, from the device 104, (ii) analyze the data indicative of the conversations and, in response, (iii) select data indicative of context-specific responses for the user queries and (iv) transmit the data indicative of context-specific responses to the device 104. To that end, the server 106 hosts an IPA service 108 associated with the IPA application 105.

The IPA service 108 comprises various components that may allow implementing at least some functionalities of the present technology. For example, the IPA service 108 may implement, inter alia, a neural network 130 comprising a context sub-network 132 and a response sub-network 134.

Generally speaking, a given neural network consists of an interconnected group of artificial "neurons", which process information using a connectionist approach to computation. Neural networks are used to model complex relationships between inputs and outputs (without actually knowing the relationships) or to find patterns in data. Neural networks are first conditioned in a training phase in which they are provided with a known set of "inputs" and information for adapting the neural network to generate appropriate outputs (for a given situation that is being attempted to be modelled). During this training phase, the given neural network adapts to the situation being learned and changes its structure such that the given neural network will be able to provide reasonable predicted outputs for given inputs in a new situation (based on what was learned). Thus rather than try to determine a complex statistical arrangements or mathematical algorithms for a given situation; the given neural network tries to provide an "intuitive" answer based on a "feeling" for a situation. The given neural network is thus a kind of a trained "black box", which can be used in a situation when what is in the "box" is unimportant; it is only important that the "box" provide reasonable answers to given inputs.

Neural networks are commonly used in many such situations (where it is only important to know an output based on a given input, but exactly how that output is derived is of lesser importance or is unimportant.) For example, neural networks are commonly used to optimize the distribution of web-traffic between servers and in data processing, including filtering, clustering, signal separation, compression, vector generation and the like.

It is contemplated that some neural networks may be formed by more than one sub-network of "neurons", where each sub-network receives some of the inputs of a given neural network and adapts, in combination with the other sub-networks of the given neural network, to generate appropriate outputs. For example, in this case, the neural network 130 comprises the context sub-network 132 and the response sub-network 134 that are trained in combination to provide appropriate outputs of the neural network 130.

To summarize, the use of the neural network 130 can be broadly categorized into two phases—a training phase and an in-use phase. First, the neural network 130 (e.g., the context and response sub-network 132 and 134) needs to be trained in the training phase (i.e. "machine learning"). Then, once the context and the response sub-network 132 and 134 know what data to expect as inputs and what data to provide as outputs, the neural network 130 is actually run using in-use data in the in-use phase.

How the neural network 130 (e.g., the context and the response sub-network 132 and 134) and other components of the IPA service 108 are implemented, trained and used for implementing at least some of the above-mentioned functionalities of the IPA service 108 will be described in greater detail further below.

The server 112 is also communicatively coupled to a snippet database 120, a vector database 122 and a processing database 124. In the depicted illustration, the snippet database 120, the vector database 122 and the processing database 124 are depicted as separate physical entities. This does not need to be so in each and every embodiment of the present technology. As such, some or all of the snippet database 120, the vector database 122 and the processing database 124 may be implemented in a single database. Furthermore, any one of the snippet database 120, the vector database 122 and the processing database 124 may, in itself, be split into several distributed storages. By the same token, all (or any combination of) the snippet database 120, the vector database 122 and the processing database 124 may be implemented in a single hardware apparatus.

Processing Database

The processing database 124 is configured to store information extracted or otherwise determined or generated by the server 106 during processing. Generally speaking, the processing database 124 may receive data from the server 106 which was extracted or otherwise determined or generated by the server 106 during processing for temporary and/or permanent storage thereof and may provide stored data to the server 106 for use thereof.

Snippet Database

Figure 2:
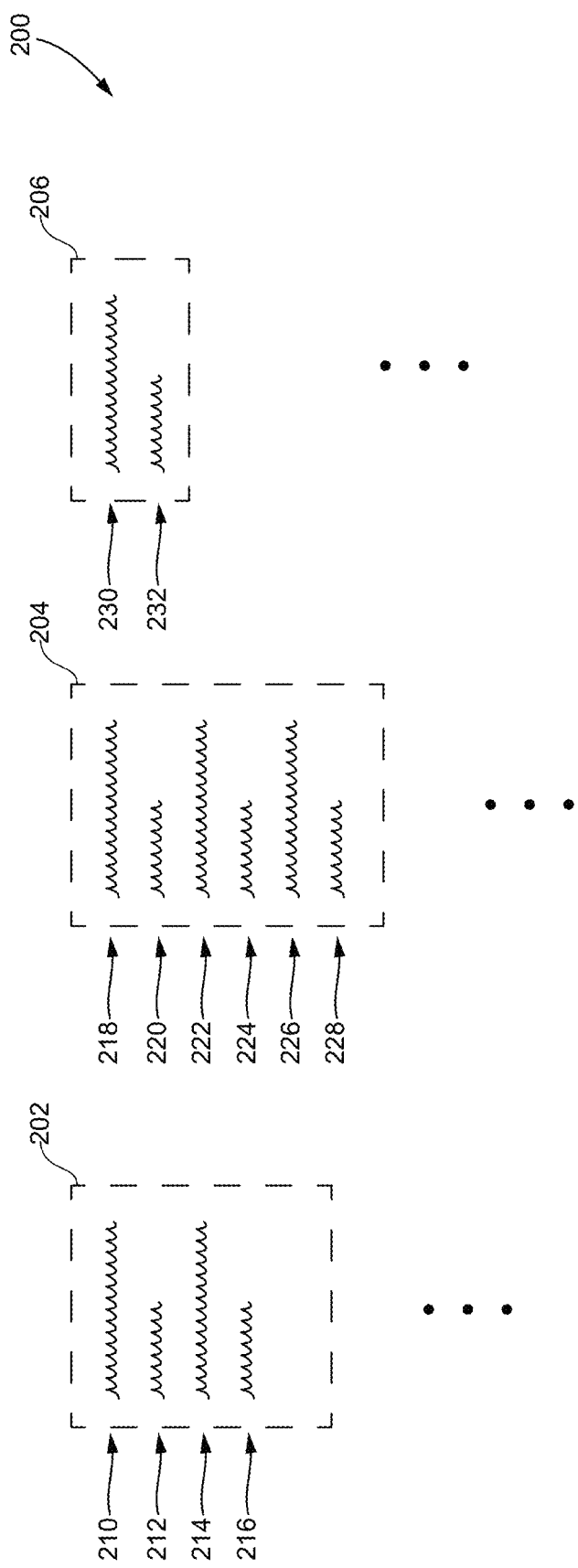
FIG. 2 depicts an illustrative example of data stored in a snippet database of the system of FIG. 1 according to some embodiments of the present technology.

With reference to FIG. 2, there is depicted an illustrative example of a plurality of conversation snippets 200 stored in the snippet database 120 which has been collected from various sources. For example, the plurality of conversation snippets 200 may be collected from social-media websites, chat-rooms, emails, text messages and the like. In the illustrative example of FIG. 2, the plurality of conversation snippets 200 comprises a first conversation snippet 202, a second conversation snippet 204 and a third conversation snippet 206. However, it should be understood that a large number of conversation snippets such as 10000, 100000, 1000000 and the like, may be collected and stored in the snippet database 120 without departing from the scope of the present technology.

Each one of the plurality of conversation snippets 200 is associated with a respective conversation comprising queries and responses submitted by "speakers" (human and/or machine-based) of the respective conversation. As such, each one of the plurality of conversation snippets 200 comprises (i) query snippets representative of the queries of the respective conversation and (ii) response snippets representative of the responses of the respective conversation.

For example, the first conversation snippet 202 comprises query snippets 210 and 214 as well as response snippets 212 and 216. In another example, the second conversation snippet 204 comprises query snippets 218, 222, 226 and response snippets 220, 224 and 228. In yet another example, the third conversation snippet 206 comprises a query snippet 230 as well as a response snippet 232.

It is noted that a given response in a given conversation can be said to be provided (by the associated user) (i) in response to a given query and (ii) in view of a particular "context". For example, the given response in the given conversation is provided in response to a given query that precedes the given response in the given conversation. Thus, it can be said that the given response is "logically" related to the given query that precedes the given response since the given response was provided in response thereto and includes some logical information related to the given query. However, the given response is also provided in view of a context of the given conversation. For example, the given conversation may be in a formal context, such as a conversation with a coworker, or in a familiar context, such as a conversation with a friend or family member. Thus, it can be said that the given response is "linguistically" related to the context of the given conversation since the given response may be provided using a formal vocabulary or a familiar vocabulary, depending on the context of the given conversation in which the given response is provided.

The context for a given response in a given conversation may be derived from all of the queries and responses that precede the given response since the given response will, in a sense, mimic the "linguistical" nature, by means of a particular use of vocabulary or slang, of the preceding queries and responses of the given conversation.

As such, it can be said that the context associated with a given response comprises a portion of the respective conversation that precedes the respective response. For example, in the first conversation snippet 202, a context snippet for the response snippet 216 comprises (i) the query snippets 210 and 214 and (ii) the response snippet 212. Also, in the first conversation snippet 202, a context snippet for the response snippet 212 comprises the query snippet 210. In another example, in the second conversation snippet 204, a context snippet for the response snippet 228 comprises (i) the query snippets 218, 222 and 226 and (ii) the response snippets 220 and 224. Also, in the second conversation snippet, a context snippet for the response snippet 224 comprises (i) the query snippets 218 and 222 and (ii) the response snippet 220. Also, in the second conversation snippet, a context snippet for the response snippet 220 comprises the query snippet 218. In yet another example, in the third conversation snippet 206, a context snippet for the response snippet 232 is the query snippet 230.

The server 106 may be configured to use at least some of the plurality of conversation snippets 200 stored in the snippet database 120 for training the neural network 130. The server 106 may also be configured to use at least some of the plurality of conversation snippets 200 stored in the snippet database 120 during the in-use phase of the neural network 130. How the server 106 may use at least some of the plurality of conversation snippets 200 stored in the snippet database 120 for training and using the neural network 130 will be described in greater detail below.

Vector Database

Generally speaking, the vector database 122 is configured to store a plurality of vectors associated with respective conversation snippets stored in the snippet database 120. The plurality of vectors may be generated by the server 106 employing the neural network 130 during its in-use phase. The server 106 may also make use of the plurality of vectors stored in the vector database 122 in order to select context-specific responses for new (in-use) user queries. Put another way, the vector database 122 is configured to store one or more collections of vector data associated with respective conversation snippets and/or respective context and response snippets from the snippet database 120 and where the one ore more collection of vector data is (i) generated by the neural network 130 and (ii) used by the server 106 for selection of context-specific responses.

How the neural network 130 is trained, during its training phase, based on the at least some of the plurality of conversation snippets 200 stored in the snippet database 120 and how the neural network 130 is used, during its first in-use phase, for populating the vector database 122 based on at least some of the plurality of conversation snippets 200 will now be described in turn. However, it should be noted that the at least some of the plurality of conversation snippets 200 used during the training phase may or may not include at least some of the plurality of conversation snippets 200 used during the in-use phase of the neural network 130 without departing from the scope of the present technology.

Figure 3:
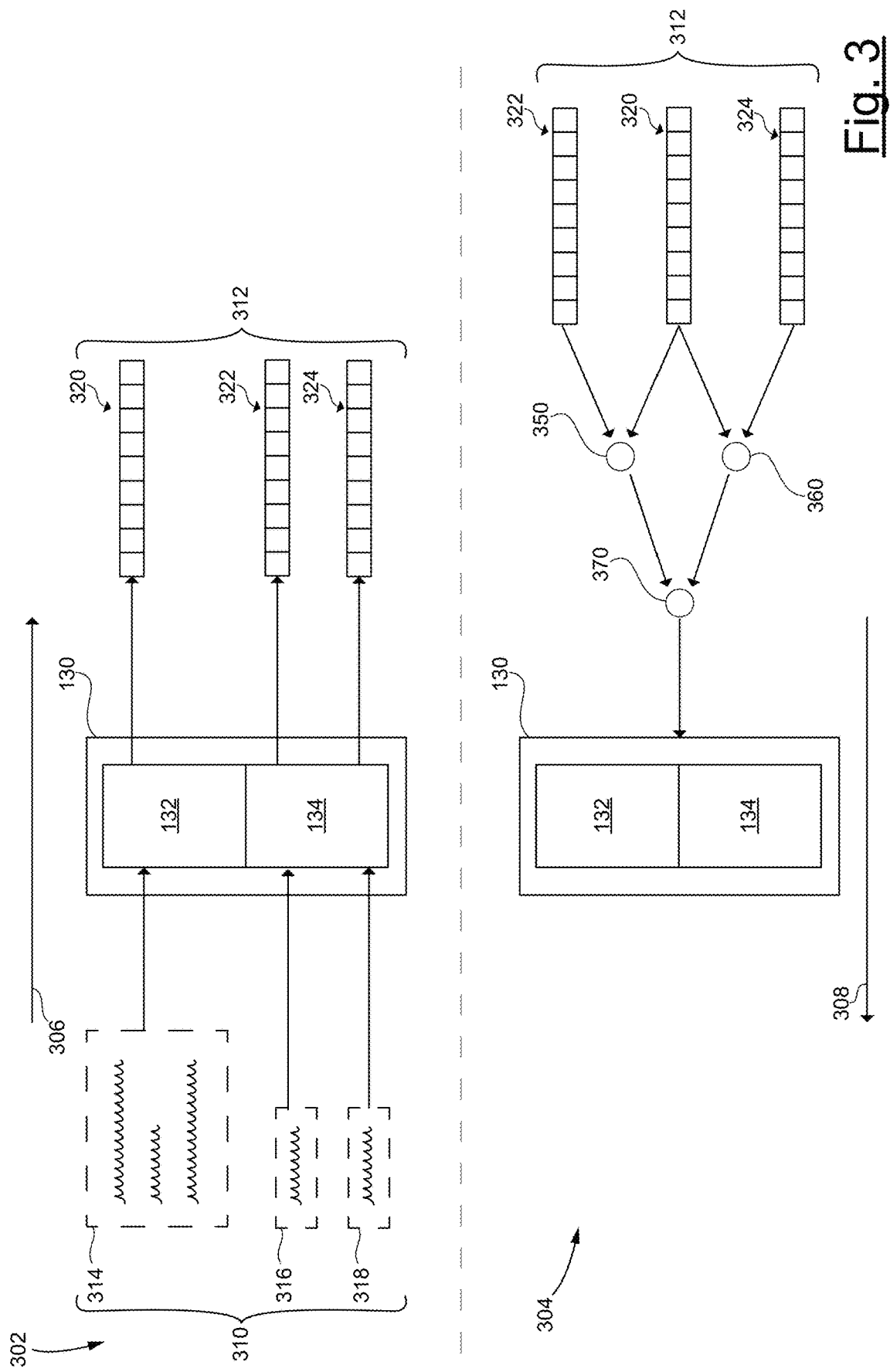
FIG. 3 is a schematic illustration of a training phase of a neural network of the system of FIG. 1 according to some embodiments of the present technology.

With reference to FIG. 3, there is depicted an illustrative example of a single training iteration of the neural network 130 according to some embodiments of the present technology. It should be noted that, although only a single training iteration will now be described, it should be understood that, during the training phase of the neural network 130, a large number of training iterations may be executed similarly to how the single training iteration illustrated in FIG. 3 is executed in order to train the neural network 130 without departing from the scope of the present technology.

The training iteration of the neural network 130 depicted in FIG. 3 comprises a first sub-iteration 302 and a second sub-iteration 304. During the first sub-iteration 302, a forward-propagation procedure 306 is executed during which (i) a training object 310 is inputted into the neural network 130 and (ii) a plurality of training vectors 312 is outputted by the neural network 130. The training object 310 is generated by the server 106 based on information stored in the snippet database 120. The training object 310 comprises a training context snippet 314, a first training response snippet 316 and a second training response snippet 318.

The first training response snippet 316 occurred with the first training response snippet 316 in a common training conversation snippet amongst the plurality of conversation snippets 200 stored in the snippet database 120. For example, the training context snippet 314 may comprise the query snippet 210, the response snippet 212 and the query snippet 214 of the first conversation snippet 202 while the first training response snippet 316 may be the response snippet 216 of the first conversation snippet 202 (see FIG. 2). Thus, it can be said that the training context snippet 314 is representative of the context of the response represented by the first training response snippet 316.

On the other hand, the second training response snippet 318 did not occur with the training context snippet 314 in any of the plurality of conversation snippets 200 stored in the snippet database 120. The server 106 may be configured to select any response snippet as the second training response snippet 318 as long as the any response snippet did not occur with the training context snippet 314 in a common conversation snippet amongst the plurality of conversation snippets 200.

The training context snippet 314 is inputted into the context sub-network 132 of the neural network 130, while the first and the second training response snippet 316 and 318 are inputted into the response sub-network 134. As such, the context sub-network 132 generates a training context vector 320 based on the training context snippet 314 while the response sub-network 134 generates first and second training response vectors 322 and 324 based on the first and second training response snippet 316 and 318, respectively. Once the plurality of training vectors 312 comprising the training context vector 320 and the first and second training response vector 322 and 324 are outputted by the neural network 130, the first sub-iteration 302 is completed and a second sub-iteration 304 may begin. It should be noted that all of the training vectors in the plurality of training vectors 312 have an equal number of dimensions or, put another way, are of a same dimensionality.

Generally speaking, during the second sub-iteration 304 a back-propagation procedure 308 is executed during which, the context and response sub-network 132 and 134 may adapt to the situation being learned and may change their structures (e.g., interconnections between the artificial "neutrons").

During the second sub-iteration 304, a positive-example vector similarity value 350 and a negative-example vector similarity value 360 may be generated by the server 106 based on the plurality of training vectors 312. The positive-example vector similarity value 350 is generated based on the training context vector 320 and the first training response vector 322. The positive-example vector similarity value 350 is indicative of a similarity between the training context vector 320 and the first training response vector 322. The negative-example vector similarity value 360 is generated based on the training context vector 320 and the second training response vector 324. The negative-example vector similarity value 360 is indicative of a similarity between the training context vector 320 and the second training response vector 324.

It should be appreciated that the positive-example vector similarity value 350 and the negative-example vector similarity value 360 may be generated in different ways and will depend, inter alia, on different implementations of the present technology. For example, a given vector similarity value may be generated as a value that is inversely proportional to a vector distance between a respective pair of vectors. As such, the given vector similarity value may be indicative of the vector distance between a respective pair of vectors. In another example, the given vector similarity may be generated as a scalar multiplication between the respective pair of vectors.

For the purposes of the illustration to be presented herein below, it shall be assumed that the positive-example vector similarity value 350 is generated as a scalar multiplication of the training context vector 320 and the first training response vector 322 and that the negative-example vector similarity value 360 is generated as a scalar multiplication of the training context vector 320 and the second training response vector 324. However, as previously mentioned, it is contemplated that the positive-example vector similarity value 350 and the negative-example vector similarity value 360 may be generated in different ways in different implementations of the present technology.

It should also be understood that the positive-example vector similarity value 350 is associated with the training context snippet 314 and the first training response snippet 316 that occurred in a common training conversation snippet. Also, the negative-example vector similarity value 360 is associated with the training context snippet 314 and the second training response snippet 318 that did not occur in any common training conversation snippet. Hence, it can be said that the positive-example vector similarity value 350 is determined by the operator of the server 106 as a "positive example" for the neural network 130 and, thus, should be superior to the negative-example vector similarity value 360, which is determined by the operator of the server 106 as a "negative example" for the neural network 130. Indeed, the training context vector 320 and the first training response vector 322 should be more similar to each other than the training context vector 320 and the second training response vector 324 due to the occurrence of the training context snippet 314 and the first training response snippet 316 in a common conversation snippet. Indeed, the operator of the server 106 may determine "positive and negative examples" (combinations of occurring and not occurring snippets) for the neural network 130 such that the neural network 130 is trained to generate vector similarity values for "positive examples" that are superior to vector similarity values of "negative examples".

During the second sub-iteration 304, the server 106 may be configured to generate a penalty value 370 for training the neural network 130 based on the positive-example vector similarity value 350 and the negative-example vector similarity value 360.

Generally speaking, during a back-propagation procedure 308, the penalty value 370 can be said to be "propagated", if need be, through the neural network 130 (in a backward direction) in order to change or adapt the interconnections between the "neurons" of the context and response sub-networks 132 and 134 for adapting, if need be, to the situation being learned.

In some embodiments of the present technology, if the positive-example vector similarity value 350 is superior to the negative-example vector similarity value 360, the penalty value 370 may be "null" or otherwise non-necessary for the current training iteration. Indeed, the server 106 may determine that, since the training context vector 320 and the first training response vector 322 are more similar to each other than the training context vector 320 and the second training response vector 324, there is no need to "propagate" any penalty value through the neural network 130 because the neural network 130 is adapted to the situation being learned.

However, if the positive-example vector similarity value 350 is inferior to the negative-example vector similarity value 360, the penalty value 370 may be a difference between the positive-example vector similarity value 350 and the negative-example vector similarity value 360. In this case, the server 106 may determine that, since the training context vector 320 and the first training response vector 322 are less similar to each other than the training context vector 320 and the second training response vector 324, there is a need to "propagate" the penalty value 370 since the neural network 130 did not generate the plurality of training vectors 312 that are reasonable or appropriate for the situation being learned and, therefore, is not adapted to the situation being learned.

Therefore, in some embodiments of the present technology, it can be said that the neural network 130 is trained, based on a first given training context snippet and a first given training response snippet having occurred in a common conversation snippet and a second given training response snippet not having occurred with the first context snippet, such that a given positive-example vector similarity value between (i) a first given training response vector generated based on the first given response snippet and (ii) a first given training context vector generated based on the first given training context snippet is superior to a given negative-example vector similarity value between (i) a second given training response vector generated based on the second given training response snippet and (ii) the first given training context vector.

As has been alluded to above, in some embodiments of the present technology, if the positive-example vector similarity value 350 is superior, by at least a pre-determined threshold value, to the negative-example vector similarity value 360, the penalty value 370 may be "null" or otherwise non-necessary for the current training iteration. However, if the positive-example vector similarity value 350 is not superior, by at least the pre-determined threshold value, to the negative-example vector similarity value 360, the penalty value 370 may be the difference between the positive-example vector similarity value 350 and the negative-example vector similarity value 360. The pre-determined threshold value may be determined by an operator of the server 106 and will depend, inter alia, on different implementations of the present technology.

Therefore, in other embodiments of the present technology, it can be said that the neural network 130 is trained, based on a first given training context snippet and a first given training response snippet having occurred in a common conversation snippet and a second given training response snippet not having occurred with the first context snippet, such that a given positive-example vector similarity value between (i) a first given training response vector generated based on the first given response snippet and (ii) a first given training context vector generated based on the first given training context snippet is superior, by at least the pre-determined threshold value, to a given negative-example vector similarity value between (i) a second given training response vector generated based on the second given training response snippet and (ii) the first given training context vector.

In summary, it can be said that the neural network 130 (e.g., the context sub-network 132 and the response sub-network 134) is trained, in a sense, to generate context and response vectors such that differences between positive-example vector similarity values and the negative-example vector similarity values are maximised. Indeed, the neural network 130 is trained to generate given context vectors and given response vectors such that (i) context vectors and response vectors associated with context snippets and response snippets, respectively, that occur in common conversation snippets are more similar to (ii) context vectors and response vectors associated with context snippets and response snippets, respectively, that do not occur in common conversation snippets.

Once the second sub-iteration 304 is completed, a next training iteration of the neural network 130 may be executed by the server 106 similarly to how the single training iteration illustrated in FIG. 3 is executed.

Figure 4:
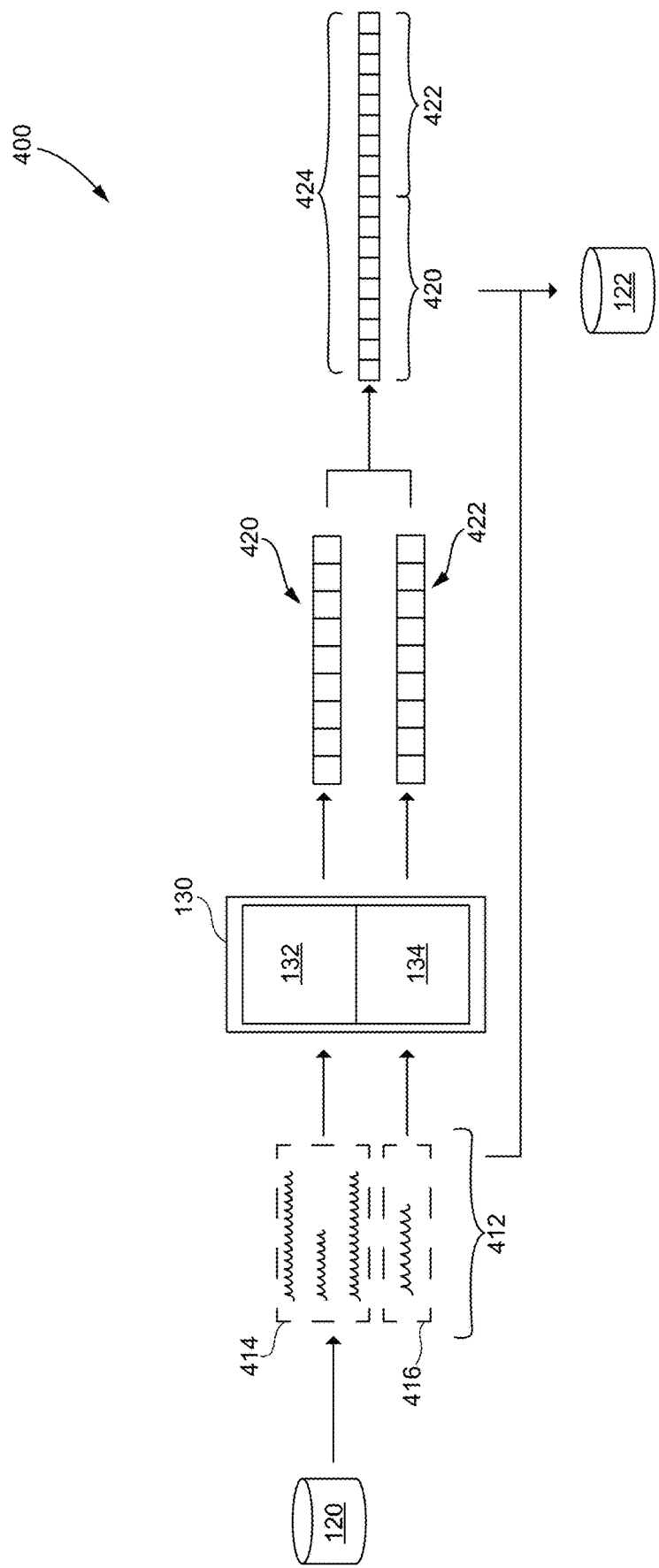
FIG. 4 depicts an illustrative example of a vector generation procedure for populating a vector database of the system of FIG. 1 according to some embodiments of the present technology.

Once the neural network 130 has been trained during its training phase, the server 106 may employ the neural network 130, during its first in-use phase, for populating the vector database 122. With reference to FIG. 4, there is depicted an illustrative example of a vector generation process 400 for populating the vector database 122.

The server 106 retrieves data indicative of a conversation snippet 412 from the snippet database 120. The server 106 analyzes the conversation snippet 412 and extracts a context snippet 414 and a response snippet 416. The context snippet 414 is inputted into the context sub-network 132 while the response snippet 416 is inputted into the response sub-network 134. The context sub-network 132 outputs a context vector 420 and the response sub-network 134 outputs a response vector 422. In some embodiments, the context vector 420 and the response vector 422 are concatenated by the server 106 in order to generate a vector 424 which comprises (i) the context vector 420 and the response vector 422. The vector 424 is then stored in the vector database 122 in association with the conversation snippet 412.

It is contemplated that, in other embodiments of the present technology, the server 106 may store the context vector 420 and the response vector 422 both in association with the conversation snippet 412 in the vector database 122, without concatenating the context vector 420 and the response vector 422 into the vector 424.

It should be noted that the context vector 420 generated by the context sub-network 132 is indicative of features of the context snippet 414 while the response vector 422 generated by the response sub-network 134 is indicative of features of the response snippet 416. Indeed, the context vector 420 is indicative of features of the context snippet 414 since it was generated based on the context snippet 414 and the response vector 422 is indicative of features of the response snippet 416 since it was generated based on the response snippet 416. However, as previously alluded to, the neural network 130 (e.g., the context and response sub-network 132 and 134) tries to provide an "intuitive" answer based on a "feeling" for a situation. The neural network 130 is thus a kind of a trained "black box", which can be used in a situation when what is in the "box" is unimportant; it is only important that the "box" provide reasonable answers to given inputs.

As such, it can be said that it is unimportant which features, in particular, of the context snippet 414 is the context vector 420 indicative of, however, it is important that the context vector 420 is indicative of at least some linguistic and logical features of the context snippet 414 such that a given similarity value between the context vector 420 with the response vector 422 is superior to a given similarity value of the context vector 420 with another response vector associated with a response snippet that did not occur with the context snippet 414.

It can also be said that it is unimportant which features, in particular, of the response snippet 416 is the response vector 422 indicative of, however, it is important that the response vector 422 is indicative of at least some linguistic and logical features of the response snippet 416 such that a given similarity value between the context vector 420 with the response vector 422 is superior to a given similarity value of the response vector 422 with another context vector associated with a context snippet that did not occur with the response snippet 416.

The assumption that (i) the context vector 420 is indicative of at least some linguistic and logical features of the context snippet 414 and (ii) the response vector 422 is indicative of at least some linguistic and logical features of the response snippet 416, can be made because, as previously explained, context snippets and response snippets that occur in a common conversation snippet are "logically" and "linguistically" related amongst each other. Therefore, training the neural network 130 to generate context vectors and response vectors for respective context and response snippets that occurred together such that these context and response vectors are similar, results in training the neural network 130 to generate these context and response vectors such that they are indicative of at least some linguistic and logical features because these features should be similar due to the occurrence of the the respective context and response snippets.

A respective vector generation process may be executed for each conversation snippet stored in the snippet database 120 similarly to how the vector generation process 400 is executed but the server 106 for the conversation snippet 412.

Returning to the description of FIG. 1, as previously mentioned, the server 106 hosts the IPA service 108 and is configured to (i) receive data indicative of conversations, which comprise user queries, from the device 104, (ii) analyze the data indicative of the conversations and, in response, (iii) select data indicative of context-specific responses for the user queries and (iv) transmit the data indicative of context-specific responses to the device 104.

How some of the these functionalities of the server 106 are implemented will now be described.

Let it be assumed that the sound indication 152 (e.g., a spoken utterance of the user 102) is detected or captured by the device 104. The IPA application 105 extracts, from the sound indication 152, the data indicative of the first query "Hey, you there?".

Let it also be assumed that the IPA service 108 generates a first context-specific response "Yeah." at least partially based on (i) the first query (in this case, the first query snippet is also a context snippet for the first context-specific response). The server 106 then transmits to the device 104 the data indicative of the first context-specific response. It is contemplated that the data indicative of the first context-specific response may be stored in the processing database 124 in association with the first query.

Let is also be assumed that the device 104 generates, based on the data indicative of the first context-specific response, the sound indication 154 (e.g., a "spoken utterance" of the IPA application 105) and provides or reproduces it for the user 102.

Let it also be assumed that the sound indication 156 (e.g., another spoken utterance of the user 102) is then detected or captured by the device 104. The IPA application 105 extracts, from the sound indication 156, the data indicative of the second query "What's up with you?". Put another way, at this moment in time, the conversation 150 may be as follows:

"Hey, are you there?"
"Yeah."
"What's up with you?"

The device 104 may be configured to generate a data packet 180 which comprises data indicative of the conversation 150, such as data indicative of (i) the first query, (ii) the first context-specific response and (iii) the second query. The device 104 is configured to transmit the data packet 180 via the communication network 110 to the server 106. It is contemplated that the content of the data packet 180 may be stored in the processing database 124 by the server 106 upon reception thereof.

Upon receiving the data packet 180, the server 106 may transmit its content to the IPA service 108 for processing. Generally speaking, the IPA service 108 is configured to select, based on at least some content of the data packet 180, a given context-specific response for the second query. To that end, the IPA service 108 may employ the context sub-network 132 of the neural network 130, during a second in-use phase thereof.

Figure 5:
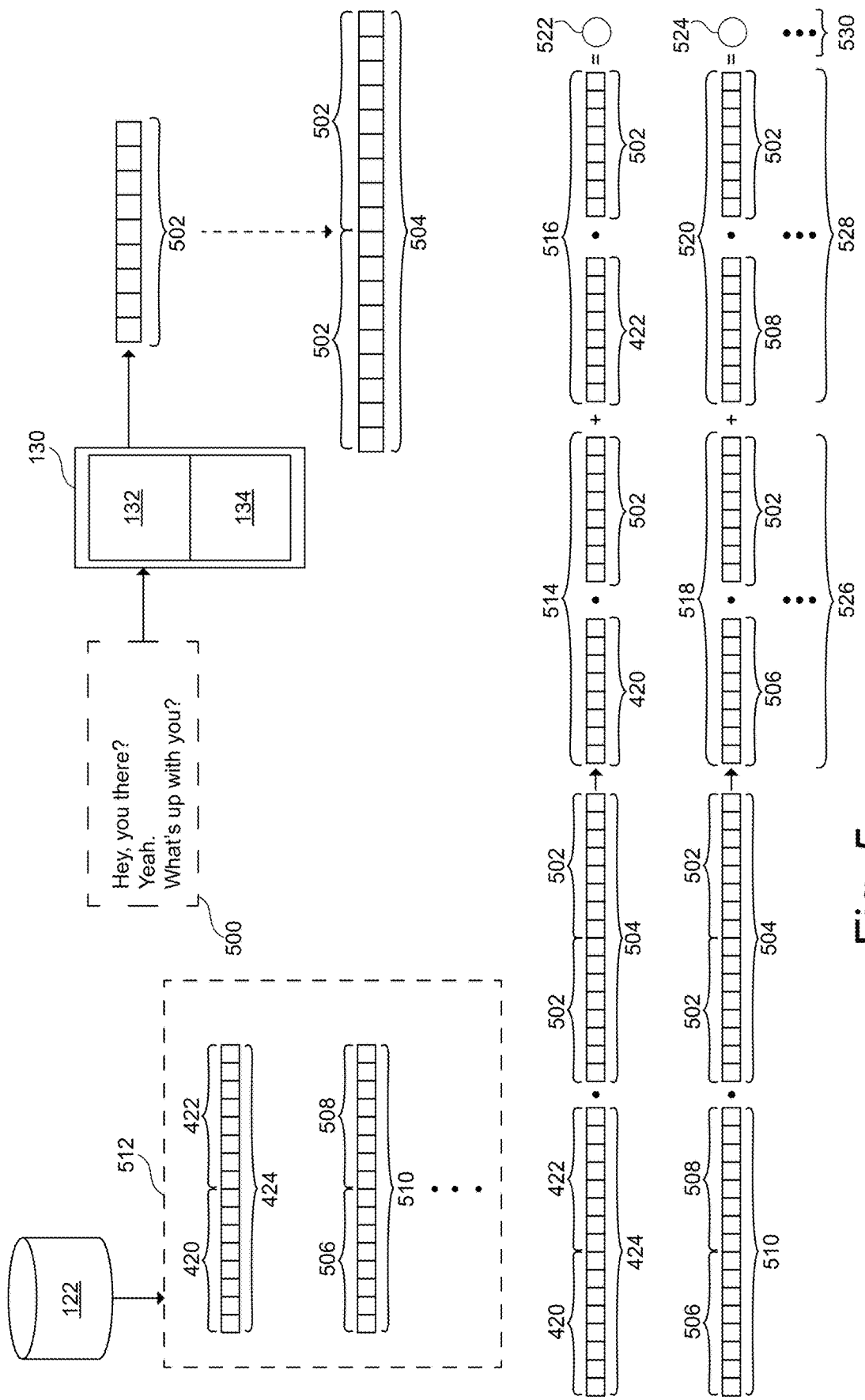
FIG. 5 depicts an illustrative example of generation of ranking scores for selecting a given context-specific response according to some embodiments of the present technology.

With reference to FIG. 5, there is depicted an illustrative example of how the context sub-network 132 may be employed by the server 106 for selecting the given context-specific response for the second query.

When the content of the data packet 180 is transmitted to the IPA service 108, the IPA service 108 may extract therefrom data indicative of a current context snippet 500. The current context snippet 500 is representative of the conversation 150, so far, between the user 102 and the IPA application 105 of the device 104. It should be noted that the current context snippet comprises a current query "What's up with you?" (e.g., the second query) for which a current context-specific response (e.g., the given context-specific response) is to be provided. The current context snippet 500 is inputted into the context sub-network 132 which, in response generates a current context vector 502. In some embodiments, the server 106 may be configured to generate a double current context vector 504 by concatenating the current context vector 502 with a copy thereof.

The server 106 may retrieve from the vector database 122, having been populated following the first in-use phase of the neural network 130, a plurality of vectors 512. It should be noted that each one of the plurality of vectors 512 is associated with a respective conversation snippet (e.g., a respective context snippet and a respective response snippet). For example, the plurality of vectors 512 comprises the vector 424, which comprises the context vector 420 and the response vector 422, and a vector 510, which comprises a context vector 506 and a response vector 508. However, it should be understood, that the plurality of vectors 512 may comprise a large number of vectors such as 10000, 100000, 1000000, and the like.

In some embodiments, the plurality of vectors 512 may comprise all the vectors stored in the vector database 122. In other embodiments, the plurality of vectors may be a sub-set of vectors selected from the all vectors stored in the vector database 122. For example, the selection of the sub-set of vectors from the all vectors may be executed by the server 106 based on a given closest-neighbor-similarity algorithm as it will become apparent from the description below.

The server 106 is also configured to generate, for each one of the plurality of vectors 512, a respective ranking score. Each ranking score is a sum of a respective first vector similarity value and a respective second vector similarity value.

For example, the server 106 may be configured to generate a first vector similarity value 514 and a second vector similarity value 516 based on the vector 424 and a double current context vector 504. The server 106 may be configured to generate a ranking score 522 for the vector 424 as a scalar multiplication between the vector 424 and the double current context vector 504. The sum of the first vector similarity value 514 and of the second vector similarity value 516 is equal to the ranking score 522.

The first vector similarity value 514 is a scalar multiplication between the context vector 420 and the current context vector 502. The higher the first vector similarity value 514 is, the more similar the context vector 420 and the current context vector 502 are. Since a given context of a given conversation may be indicative of a linguistic "nature" (e.g., the style of speech) of the given conversation, the higher the first vector similarity value 514 is, the more linguistically similar the context snippet 414 and the current context snippet 500 are. It can thus be said that the first vector similarity value 514 is indicative of a linguistic similarity between the context snippet 414 (see FIG. 4) associated with the context vector 420 and the current context snippet 500 associated with the current context vector 502.

The second vector similarity value 516 is a scalar multiplication between the response vector 422 and the current context vector 502. The higher the second vector similarity value 516 is, the more similar the response vector 422 and the current context vector 502 are. In other words, the higher the second vector similarity value 516 is, the more linguistically and logically similar the response snippet 416 and the current context snippet 500 are, because of how the neural network 130 has been trained during the training phase. It can thus be said that the second vector similarity value 516 is indicative of a logical and linguistic similarity between the response snippet 416 (see FIG. 4) associated with the response vector 422 and the current context snippet 500 associated with the current context vector 502.

In another example, the server 106 may be configured to generate a first vector similarity value 518 and a second vector similarity value 520 based on the vector 510 and the double current context vector 504. The server 106 may be configured to generate a ranking score 524 for the vector 510 as a scalar multiplication between the vector 510 and the double current context vector 504. The sum of the first vector similarity value 518 and of the second vector similarity value 520 is equal to the ranking score 524.

The first vector similarity value 518 is a scalar multiplication between the context vector 506 and the current context vector 502. It can thus be said that the first vector similarity value 518 is indicative of a linguistic similarity between a given context snippet 414 associated with the context vector 506 and the current context snippet 500 associated with the current context vector 502. The second vector similarity value 520 is a scalar multiplication between the response vector 508 and the current context vector 502. It can thus be said that the second vector similarity value 520 is indicative of a logical similarity between a given response snippet associated with the response vector 508 and the current context snippet 500 associated with the current context vector 502.

As illustrated in FIG. 5, the server 106 may be configured to generate a plurality of first vector similarity values 526 and a plurality of second vector similarity values 528. For example, each one of the plurality of vectors 512 is associated with a respective one of the first vector similarity values 526 and with a respective one of the second vector similarity values 528.

The server 106 is also configured to generate a plurality of ranking scores 530. It is contemplated that, in some embodiments of the present technology, a given ranking score may be a weighted sum of the respective first vector similarity value and of the respective second vector similarity value. This may allow giving, in a sense, more importance, during selection of the current context-specific response, to a logical similarity of the current context-specific response with the current query or to a linguistic similarity of the current context-specific response with the current context.

In some embodiments of the present technology, the server 106 may also be configured to generate a ranked plurality of vectors (not depicted) comprising the plurality of vectors 512 ranked according their respective ranking scores in the plurality of ranking scores 530. It is also contemplated that the server 106 may be configured to select a given response snippet associated with a top ranked vector from the ranking plurality of vectors.

For example, let it be assumed that the ranking score 522 associated with the vector 424 is superior to any other ranking score amongst the plurality of ranking scores 530. Let it also be assumed that the vector 424, and more particularly, the response vector 422 is associated with the response snippet 416 being "All good, I'm cool.". As such, the server 106 may be configured to select the response snippet 416 as the current context-specific response for the current query "What's up with you?". It should be noted that, instead of selecting a response such as "I am doing well, thank you." which is not associated with the linguistic style of the current context snippet 500, the current context-specific response selected by the IPA service 108 may "mimic" the familiar context of the current context snippet 500, while still being logically related to the current query.

The server 106 is also configured to generate a data packet 185 comprising data indicative of the current context-specific response "All good, I'm cool." and transmit it via the communication network 110 to the device 104. The IPA application 105 may then analyze the content of the data packet 185 in order to generate the sound indication 158 indicative of the current context-specific response and provide or reproduce it for the user 102.

It should be noted, that it is contemplated that providing such context-specific responses may be beneficial for the user 102. It should be appreciated that providing more "appropriate responses" to the user 102 which may, in a sense, "mimic" user's 102 style of speech may render user interfacing with the device 104 easier and more convivial. A more efficient user interfacing may be useful to the user 102 in many different situations, such as, for example, if the user is operating a road vehicle, is impaired or unable to interface, for any other reason, with the device 104 via any other user-interfacing module thereof temporarily and/or permanently.

In other implementations of the present technology, it should be appreciated that providing such "more appropriate response" to the user 102, may reduce the processing power and/or the time that it takes for the device 104 and/or the IPA application 105 to complete the task requested therefrom following the lunch of the IPA application 105 by the device 104. This may reduce power consumption and battery life of the device 104 as well as provide spare processing power for allowing execution of other applications installed and/or operating on the device 104.

Figure 6:
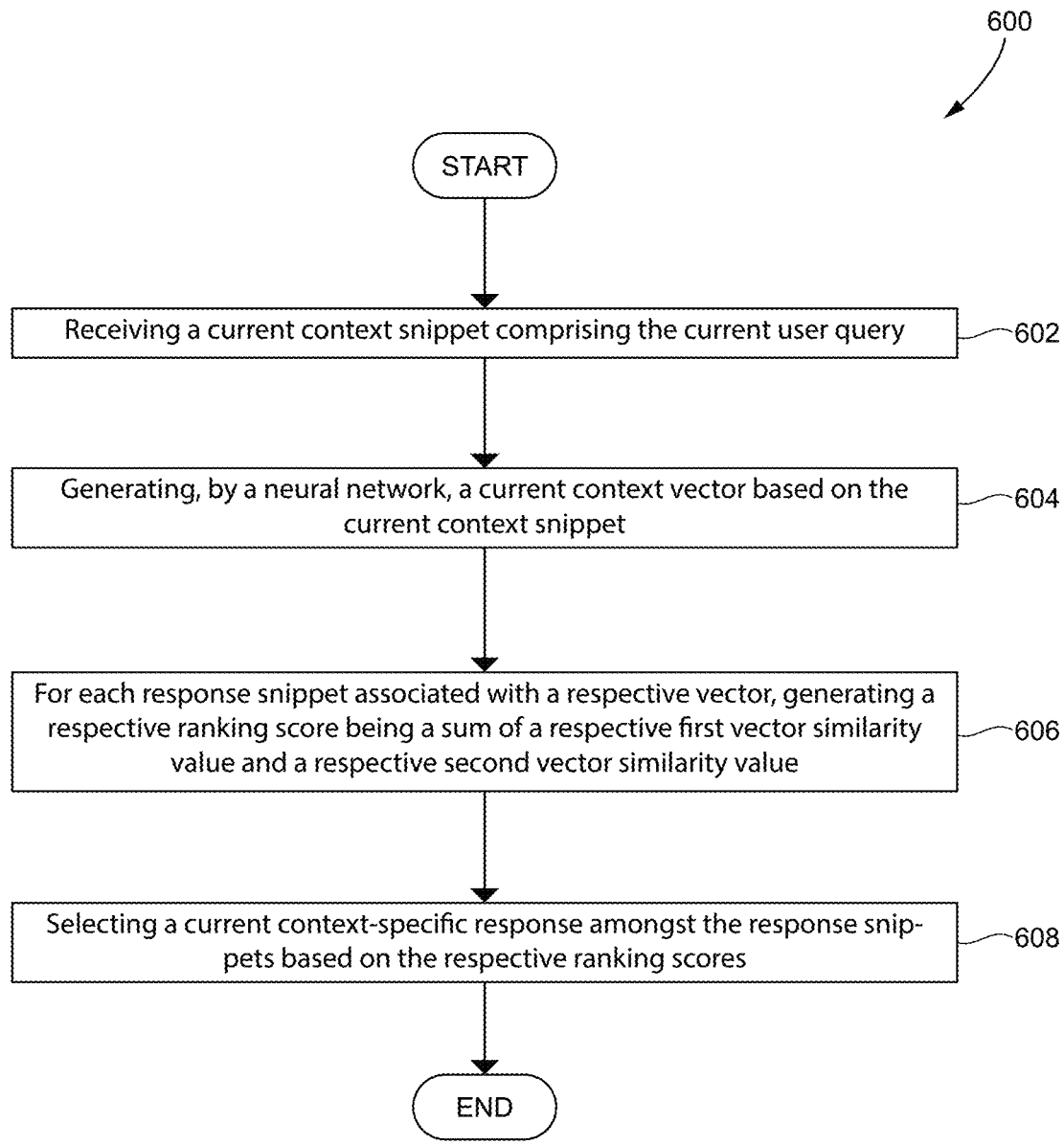
FIG. 6 is a scheme-block illustration of a method of selecting a current context-specific response for a current user query according to some embodiments of the present technology.

With reference to FIG. 6, there is depicted a scheme-block illustration of a method 600 of selecting the current context-specific response for the current user query according to some embodiments of the present technology. Although the method 600 will be described as being executed by the server 106, it should be contemplated that device 104 may be configured to execute the method 600 similarly to how the server 106 is configured to execute the method 600, without departing from the scope of the present technology.

Step 602: Receiving a Current Context Snippet Comprising the Current User Query The method 600 begins at step 602 with the server 106 receiving the current context snippet 500 comprising the current query "What's up with you?". For example, the server 106 may be configured to receive the data packet 180 (see FIG. 1) comprising data indicative of the current context snippet 500.

It is contemplated that the server 106 may be configured to store data indicative of the current context snippet 500 in the processing database 124 for future use thereof.

Step 604: Generating, by a Neural Network, a Current Context Vector Based on the Current Context Snippet The method 600 continues to step 602 with the server 106 being configured to generate, by employing the neural network 130, the current context vector 502 based on the current context snippet 500. It is contemplated that the generation of the current context vector 502 based on the current context snippet 500 is executed by the context sub-network 132 of the neural network 130. It should be noted that, as previously explained, the current context vector 502 is indicative of at least some linguistic and logical features of the current context snippet.

With reference to FIG. 3, it is contemplated that the neural network 130 comprises the context sub-network 132 and the response sub-network 134. The context sub-network 132, during the training phase thereof, generated the training context vector 320 based on the training context snippet 314. The response sub-network 134, during the training phase thereof, generated the first and second training response vector 322 and 324 based on the first and second training response snippet 316 and 318, respectively. It is contemplated that during the training phase of the neural network 130, the neural network 130 may be trained such that the positive-example vector similarity value 350 is superior by the at least the pre-determined threshold value (determined by the operator of the server 106) to the negative-example vector similarity value 360.

It is also contemplated that the neural network 130 may be trained by the server 106 to generate the training context vector 320 and the first and second training response vector 322 and 324 so as to maximize the difference between the positive-example vector similarity value 350 and the negative-example vector similarity value 360.

In some embodiments of the present technology, the neural network 130 may be trained based on at least some data stored in the snippet database 120. It is also contemplated that the at least some data stored in the snippet database 120 that is used during the training phase of the neural network 130 may or may not include at least some data stored in the snippet database 120 that is used during the first and the second in-use phases of the neural network 130.

Step 606: For Each Response Snippet Associated with a Respective Vector, Generating a Respective Ranking Score being a Sum of a Respective First Vector Similarity Value and a Respective Second Vector Similarity Value The method 600 continues to step 606 with the server 106 being configured to, for each response snippet associated with the respective one of the plurality of vectors 512 (see FIG. 5), generate a respective ranking score which is a sum of a respective first vector similarity value and a respective second vector similarity value.

It is contemplated that the server 106 may be configured to select the plurality of vectors 512 amongst the all vectors stored in the vector database 122 populated by the neural network 130 during its first in-use phase. For example, the selection of a given sub-set of vectors (e.g., the plurality of vectors 512) from the all vectors may be executed by the server 106 based on a given closest-neighbor-similarity algorithm.

It is contemplated that the server 106 may generate for the plurality of vectors 512 (i) the plurality of first vector similarity values 526, (ii) the plurality of second vector similarity values 528 and (iii) the plurality of ranking scores 530.

In some embodiments of the present technology, a respective ranking score of each one of the plurality of vectors 512 may be a weighted sum of a respective first vector similarity value and a respective second vector similarity value.

For example, the first vector similarity value 514 may be a scalar multiplication between the context vector 420 and the current context vector 502. The higher the first vector similarity value 514 is, the more similar the context vector 420 and the current context vector 502 are. Since a given context of a given conversation may be indicative of a linguistic "nature" (e.g., the style of speech) of the given conversation, the higher the first vector similarity value 514 is, the more linguistically similar the context snippet 414 and the current context snippet 500 are. It can thus be said that the first vector similarity value 514 is indicative of the linguistic similarity between the context snippet 414 (see FIG. 4) associated with the context vector 420 and the current context snippet 500 associated with the current context vector 502.

In another example, the second vector similarity value 516 may be a scalar multiplication between the response vector 422 and the current context vector 502. The higher the second vector similarity value 516 is, the more similar the response vector 422 and the current context vector 502 are. In other words, the higher the second vector similarity value 516 is, the more linguistically and logically similar the response snippet 416 and the current context snippet 500 are, because of how the neural network 130 has been trained during the training phase. It can thus be said that the second vector similarity value 516 is indicative of the linguistic and logical similarity between the response snippet 416 (see FIG. 4) associated with the response vector 422 and the current context snippet 500 associated with the current context vector 502.

In some embodiments of the present technology, it is contemplated that (i) the plurality of first vector similarity values 526, (ii) the plurality of second vector similarity values 528 and (iii) the plurality of ranking scores 530 may be stored by the server 106 in the processing database 124 for future use thereof.

Step 608: Selecting, by the Server, a Current Context-Specific Response Amongst the Response Snippets Based on the Respective Ranking Scores The method 600 ends at step 608 with the server 106 being configured to select the current context-specific response amongst the response snippets associated with respective ones of the plurality of vectors 512 based on the respective ranking scores.

It is contemplated that the server 106 may rank the response snippets associated with the respective ones of the plurality of vectors 512 based on the respective ranking scores in the plurality of ranking scores 530. The server 106 may also be configured to select the current content-specific response as the top ranked response snippet amongst the so-ranked response snippets current query.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of selecting a current context-specific response for a current user query, the method executable by a server, the server being communicatively coupled to a database storing a plurality of vectors, each vector being associated with a respective conversation snippet, each conversation snippet including a respective context snippet and a respective response snippet, each vector having (i) a respective context vector indicative of features of the respective context snippet and (ii) a respective response vector indicative of features of the respective response snippet, the context vector and the response vector of each one of the plurality of vectors having been generated by a neural network, the neural network having been trained:
based on a first context snippet and a first response snippet having occurred in a common conversation snippet and a second response snippet not having occurred with the first context snippet,
such that a positive-example vector similarity value between (i) a first response vector generated based on the first response snippet and (ii) a first context vector generated based on the first context snippet is superior to a negative-example vector similarity value between (i) a second response vector generated based on the second response snippet and (ii) the first context vector, the method comprising:
receiving, by the server, a current context snippet comprising the current user query;
generating, by the neural network of the server, a current context vector based on the current context snippet, the current context vector being indicative of features of the current context snippet;

for each response snippet associated with a respective vector, generating, by the server, a respective ranking score being a sum of:

a respective first vector similarity value between (i) the current context vector and (ii) the respective context vector, each first vector similarity value being indicative of a linguistic similarity between (i) the current context snippet and (ii) the respective context snippet; and a respective second vector similarity value between (i) the current context vector and (ii) the respective response vector, each second vector similarity value being indicative of a linguistic and a logical similarity between (i) the current context snippet and (ii) the respective response snippet; and selecting, by the server, the current context-specific response amongst the response snippets based on the respective ranking scores.

2. The method of claim 1, wherein the method further comprises ranking, by the server, the response snippets based on the respective ranking scores, and wherein the selecting the current content-specific response comprises selecting, by the server, a top ranked response snippet as the current context-specific response for the current user query.

3. The method of claim 1, wherein the neural network comprises:

a context sub-network having generated the first context vector based on the first context snippet; and a response sub-network having generated (i) the first response vector generated based on the first response snippet and (ii) the second response vector generated based on the second response snippet.

4. The method of claim 3, wherein the generating the current context vector based on the current context snippet is executed by the context sub-network.

5. The method of claim 1, wherein the neural network has been trained such that the positive-example vector similarity value is superior by at least a pre-determined threshold value over the negative-example vector similarity value.

6. The method of claim 1, wherein the neural network has been trained to generate the first context vector and the first and second response vectors so as to maximize a difference between the positive-example vector similarity value and the negative-example vector similarity value.

7. The method of claim 1, wherein the positive-example vector similarity value is indicative of a vector distance between (i) the first response vector and (ii) the first context vector, and wherein the negative-example vector similarity value is indicative of a vector distance between (i) the second response vector and (ii) the first context vector.

8. The method of claim 1, wherein the positive-example vector similarity value is a scalar multiplication between (i) the first response vector and (ii) the first context vector, and wherein the negative-example vector similarity value is a scalar multiplication between (i) the second response vector and (ii) the first context vector.

9. The method of claim 1, wherein a given first vector similarity value is a scalar multiplication between (i) the current context vector and (ii) the respective context vector, and wherein a given second vector similarity value is a scalar multiplication between (i) the current context vector and (ii) the respective response vector.

10. The method of claim 1, wherein the method further comprises selecting, by the server, the plurality of vectors based on the current context snippet amongst all vectors stored in the database.

11. The method of claim 1, wherein a given ranking score is a weighted sum of the respective first vector similarity value and the respective second vector similarity value.

12. The method of claim 1, wherein the context vector and the response vector of each one of the plurality of vectors, which have been generated by a neural network, have been concatenated into the respective one of the plurality of vectors.

13. A computer device for selecting a current context-specific response for a current user query, the computer device being communicatively coupled to a database storing a plurality of vectors, each vector being associated with a respective conversation snippet, each conversation snippet including a respective context snippet and a respective response snippet, each vector having (i) a respective context vector indicative of features of the respective context snippet and (ii) a respective response vector indicative of features of the respective response snippet, the context vector and the response vector of each one of the plurality of vectors having been generated by a neural network, the neural network having been trained:

based on a first context snippet and a first response snippet having occurred in a common conversation snippet and a second response snippet not having occurred with the first context snippet, such that a positive-example vector similarity value between (i) a first response vector generated based on the first response snippet and (ii) a first context vector generated based on the first context snippet is superior to a negative-example vector similarity value between (i) a second response vector generated based on the second response snippet and (ii) the first context vector, the computer device being configured to:

receive a current context snippet comprising the current user query;

generate, by the neural network, a current context vector based on the current context snippet, the current context vector being indicative of features of the current content snippet;

for each response snippet associated with a respective vector, generate a respective ranking score being a sum of:

a respective first vector similarity value between (i) the current context vector and (ii) the respective context vector, each first vector similarity value being indicative of a linguistic similarity between (i) the current context snippet and (ii) the respective context snippet; and a respective second vector similarity value between (i) the current context vector and (ii) the respective response vector, each second vector similarity value being indicative of a linguistic and a logical similarity between (i) the current context snippet and (ii) the respective response snippet; and select the current context-specific response amongst the response snippets based on the respective ranking scores.

14. The computer device of claim 13, wherein the computer device is further configured to rank the response snippets based on the respective ranking scores, and wherein the computer device is configured to select the current content-specific response comprises the computer device being configured to select a top ranked response snippet as the current context-specific response for the current user query.

15. The computer device of claim 13, wherein the neural network comprises:
   a context sub-network having generated the first context vector based on the first context snippet; and
   a response sub-network having generated (i) the first response vector generated based on the first response snippet and (ii) the second response vector generated based on the second response snippet.

16. The computer device of claim 15, wherein the computer device is configured to generate the current context vector based on the current context snippet by employing the context sub-network.

17. The computer device of claim 13, wherein the neural network has been trained such that the positive-example vector similarity value is superior by at least a pre-determined threshold value over the negative-example vector similarity value.

18. The computer device of claim 13, wherein the positive-example vector similarity value is indicative of a vector distance between (i) the first response vector and (ii) the first context vector, and wherein the negative-example vector similarity value is indicative of a vector distance between (i) the second response vector and (ii) the first context vector.

19. The computer device of claim 13, wherein the positive-example vector similarity value is a scalar multiplication between (i) the first response vector and (ii) the first context vector, and wherein the negative-example vector similarity value is a scalar multiplication between (i) the second response vector and (ii) the first context vector.

20. The computer device of claim 13, wherein a given first vector similarity value is a scalar multiplication between (i) the current context vector and (ii) the respective context vector, and wherein a given second vector similarity value is a scalar multiplication between (i) the current context vector and (ii) the respective response vector.

\* \* \* \* \*